United States Patent [19]

Kammeraad

[11] 4,185,368
[45] Jan. 29, 1980

[54] METHOD FOR MAKING VALVE GUIDE INSERTS

[75] Inventor: James A. Kammeraad, Holland, Mich.

[73] Assignee: K-Line Industries, Inc., Holland, Mich.

[21] Appl. No.: 844,599

[22] Filed: Oct. 25, 1977

Related U.S. Application Data

[62] Division of Ser. No. 719,958, Sep. 2, 1976, Pat. No. 4,103,662.

[51] Int. Cl.² .............................................. B23P 15/00
[52] U.S. Cl. .............................................. 29/156.7 R
[58] Field of Search .............. 29/156.4 WL, 234, 525, 29/446, 156.7 R; 123/188 GC, 188 P; 228/156, 149-151, 125

[56] References Cited

U.S. PATENT DOCUMENTS

| | | | |
|---|---|---|---|
| 1,746,927 | 2/1930 | Burgmann | 123/188 GC |
| 1,842,441 | 1/1932 | Yount | 29/156.4 WL |
| 1,955,243 | 4/1934 | Liebergeld et al. | 29/DIG. 47 |
| 2,065,049 | 12/1936 | Bullock | 123/188 GC |
| 2,170,015 | 8/1939 | Ford | 29/156.4 WL |
| 2,277,822 | 3/1942 | Essl | 123/188 GC |
| 2,500,340 | 3/1950 | Boulton | 29/156.4 WL |
| 2,674,782 | 4/1954 | Surtees | 29/156.4 WL |
| 2,778,352 | 1/1957 | Kimberly | 123/188 GC |
| 2,797,676 | 7/1957 | VanSkike | 123/188 GC |
| 2,975,087 | 3/1961 | Donald | 228/125 |
| 3,153,990 | 10/1964 | Kunzog | 29/156.4 WL |
| 3,265,052 | 8/1966 | Goloff | 123/188 GC |
| 3,809,046 | 5/1974 | Kammeraad | 123/188 GC |
| 3,828,756 | 8/1974 | Kammeraad et al. | 29/156.4 WL |

FOREIGN PATENT DOCUMENTS

| | | | |
|---|---|---|---|
| 379194 | 8/1932 | United Kingdom | 123/188 GC |
| 783070 | 9/1957 | United Kingdom | 123/188 GC |
| 869384 | 5/1961 | United Kingdom | 123/188 GC |

OTHER PUBLICATIONS

"K-Line Guide-Liner Installation Tooling", Brochure Published by K-Line Industries, Inc., Holland, Mich.

Primary Examiner—Daniel C. Crane
Attorney, Agent, or Firm—Price, Heneveld, Huizenga & Cooper

[57] ABSTRACT

The specification discloses an insert for lining and/or relining valve guides for reciprocating-type poppet valves in cylinder heads of internal combustion engines. The insert has multiple layers of metallic materials and preferably includes an inner sleeve or tube of spring-tempered phosphor bronze and an outer carrier sleeve or tube of steel or aluminum. The combined sleeves provide the insert with high wear resistance and lubricity and excellent heat transfer properties. Separate formation and later assembly allows precise control of wall thicknesses, diameters and concentricities.

Also disclosed is a method for manufacturing the insert including separately forming the inner and outer sleeves or tubes, and inserting one within the other for frictionally holding them together.

18 Claims, 12 Drawing Figures

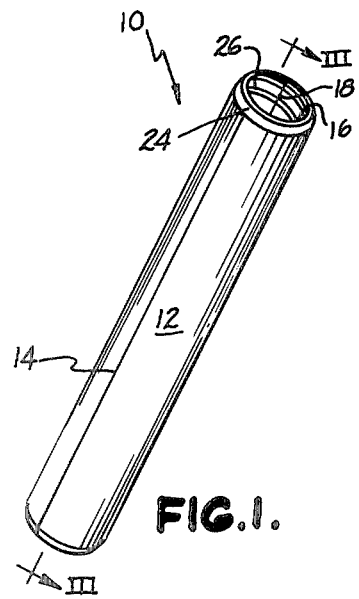
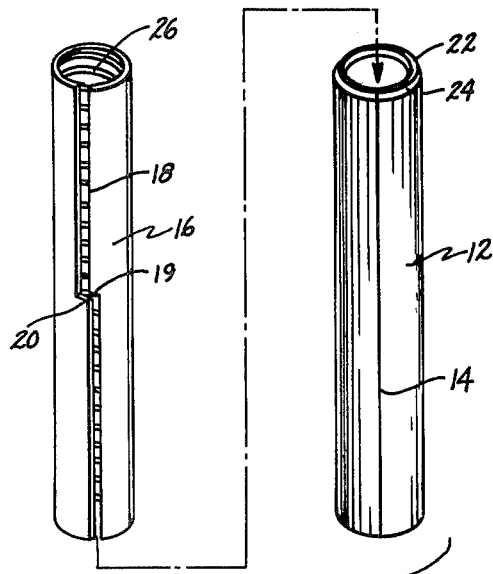
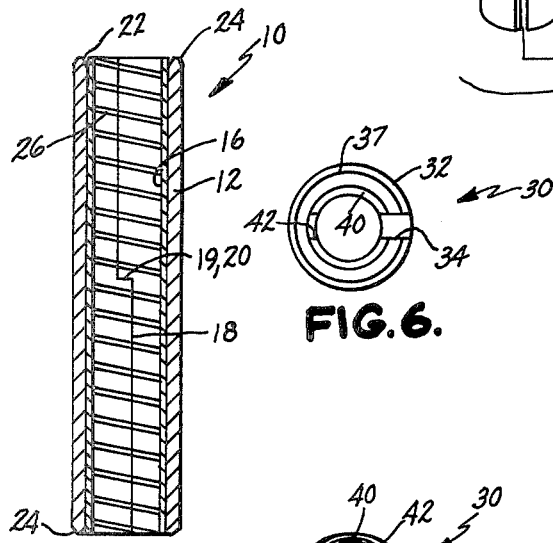
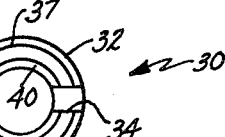
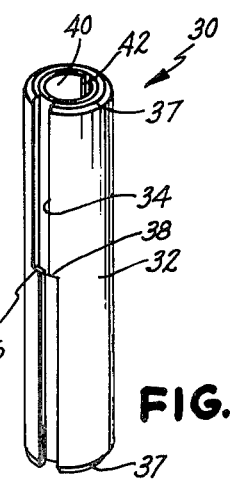
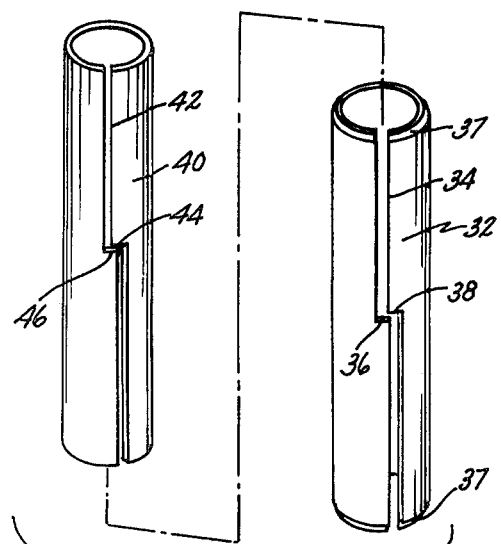

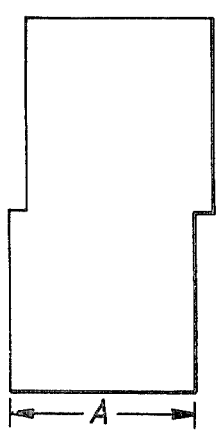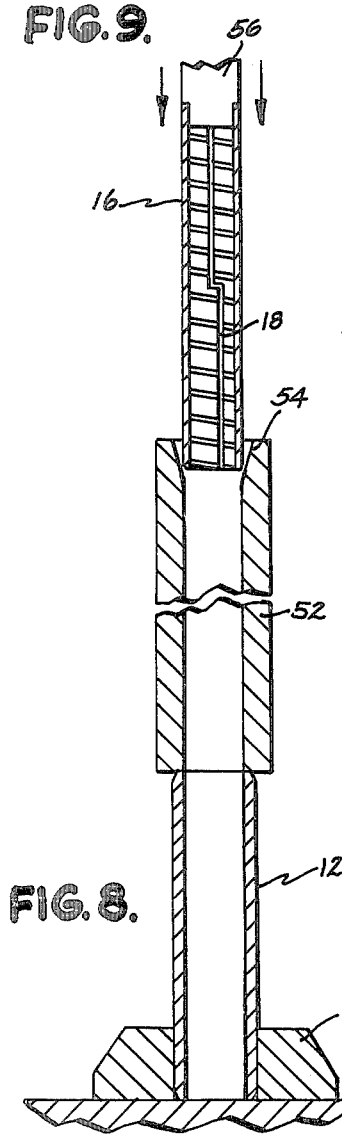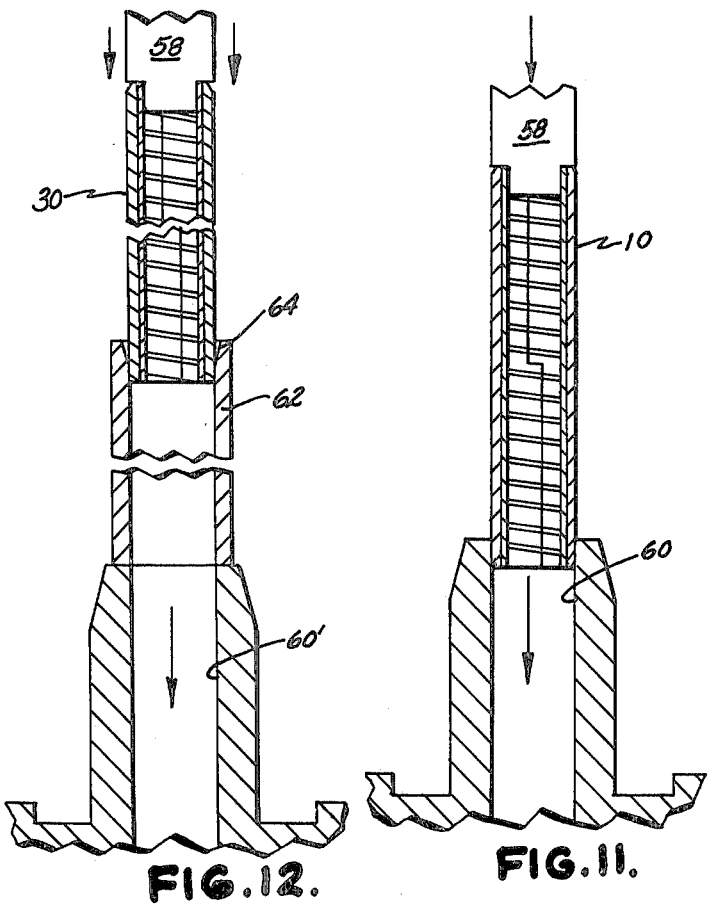

METHOD FOR MAKING VALVE GUIDE INSERTS

This is a division of application Ser. No. 719,958, filed Sept. 2, 1976, now U.S. Pat. No. 4,103,662, issued Aug. 1, 1978.

BACKGROUND OF THE INVENTION

This invention relates to devices providing a lining for a valve guide to receive the stem of a reciprocating-type poppet valve in an internal combustion engine and, more particularly, to an insert particularly adapted to line or reline a worn valve guide to return it to its original or better operating condition.

Inserts for lining or relining worn valve guides in internal combustion engines are well known. Typically, the worn valve guide of an internal combustion engine is bored out to receive a cast iron insert having an inside diameter which receives the stem of a valve fitted therethrough. The cast iron sleeve is forced fitted into or otherwise retained in the bored-out valve guide passageway.

Cast iron inserts of this type suffer from two major disadvantages. They are relatively expensive to manufacture, the meeting of tolerances with respect to wall thickness and concentricity requiring generally repeat machining of either the inner or outer insert surfaces following initial machining of the insert. The wear characteristics of these cast iron inserts, more importantly, leave much to be desired. They do offer the advantages, however, of having good heat transfer characteristics and have for years been produced in standard O.D. sizes minimizing the number of specialized tools required for installation.

Materials possessing wear characteristics substantially better than cast iron have been known for a substantial period of time. In this inventor's prior U.S. Pat. Nos. 3,828,415 and 3,828,756 there is disclosed an insert fabricated from spring-tempered phosphor bronze and a method of installing the same. This insert has achieved substantial commercial success and affords, when installed, wear characteristics markedly better than those attained with cast iron. There has been a significant problem, however, with the installation of these inserts. The physical characteristics of the insert material, its mode of installation and the rather high cost of the material, more particularly, have dictated that its wall thickness be kept as thin as practical. These dictates have resulted, for any given valve stem O.D., in a liner having an installed O.D. requiring a peculiarly sized reamer or other boring tool to form the passageway within which the insert is to be installed. These reamers are very expensive and, in many cases, mechanics, repairmen and the like have chosen to continue installing the clearly inferior cast iron guides in order to avoid the time and expense involved in the purchase and selection of these peculiarly sized tools.

Similar problems are encountered where an engine has been previously rebuilt using standard sized toolings. Removal of the now-worn replacement guide, as will be readily appreciated, leaves little choice but to rebuild with a cast iron or other guide having the same O.D.

The present invention provides an insert and method of fabricating the same which retains the salient features of the insert described and claimed in the aforenoted patents. At the same time, however, the invention preserves all significant advantages inherent in the prior art cast iron and similar inserts, particularly with respect to avoiding totally the necessity for peculiarly specialized tooling at the installation situs.

SUMMARY OF THE INVENTION

The present invention provides a multi-layered insert for lining or relining valve guides of internal combustion engines including separately formed and subsequently assembled outer and inner cylindrical tubes or sleeves fitted one within the other. The outer or carrier cylindrical sleeve has a standard outside diameter adapted to substantially match the diameter of a reamed or bored valve guide to be lined or relined, such reaming or boring having been accomplished with standard tools already on hand in virtually all shops. The inner cylindrical sleeve is substantially coterminous with and extends the entire length of the outer sleeve. The inner sleeve also has an outside wall surface adapted to tightly frictionally engage and be retained within the inside wall surface of the outer sleeve when inserted therewithin as well as an inside diameter adapted to receive a valve stem therethrough.

The invention also provides a method for forming an insert for lining/relining a valve guide of an internal combustion engine including providing first and second cylindrical sleeves or tubes each having a predetermined wall thickness and inside and outside wall surfaces, and inserting the second tube within the first such that the outside wall surface of the second tube tightly, frictionally engages the inside wall surface of the first tube to prevent separation thereof when in use.

The outer sleeve or tube, preferably, is roll formed from sheet stock the resulting longitudinally extending seam welded and the tube redrawn to eliminate the weld flash. Alternately, the seam may be left open for later contraction within a reamed valve guide. The outer sleeve may also be formed as a seamless, extruded tube in the first instance.

The inner sleeve or tube is also preferably roll formed and includes a longitudinally extending seam, the opposing edges of which are tightly abutted against one another to form a substantially seamless tube when that inner sleeve is either inserted within the outer sleeve of the closed and welded or seamless variety, or combined with an open seam, outer sleeve and inserted within a valve guide.

The product and method provides significant advantages over prior known valve guide inserts and methods for manufacturing valve guide inserts. In addition to the high wear resistance, lubricity and the excellent heat transfer properties in the multi-layered insert as mentioned above, the separate formation and subsequent assembly of the inner and outer sleeves or tubes provide precise and accurate control over dimensions and tolerances such as wall thickness and concentricity for both the individual and combined sleeves or tubes. Such control can be consistently maintained on a high volume basis without costly and time-consuming maching operations being necessary. Such increased control over dimensional tolerances provides the ability to consistently produce inserts which accurately fit the reamed or bored valve guides. Further, it is not necessary to utilize specially sized reamers or boring tools which have been previously necessary to fit irregularly sized inserts. Standard sized tools may be used with the consistently obtained tolerances providing an excellent fit for the present insert.

These and other objects, advantages, purposes and features of the invention will become more apparent from a study of the following description taken in conjunction with the drawings.

BRIEF DESCRIPTION OF THE DRAWINGS

FIG. 1 is a perspective view of a first embodiment of the insert for lining/relining valve guides;

FIG. 2 is an exploded, perspective view of the inner and outer sleeves or tubes prior to assembly to form the insert shown in FIG. 1;

FIG. 3 is a sectional view of the insert taken along plane III—III of FIG. 1;

FIG. 4 is an end view of the insert shown in FIGS. 1 and 3;

FIG. 5 is a perspective view of a second embodiment of the insert, both the inner and outer tubes having longitudinally extending seams;

FIG. 6 is an end view of the insert shown in FIG. 5;

FIG. 7 is an exploded, perspective view of the inner and outer sleeves or tubes of the insert of FIGS. 5 and 6 prior to their assembly;

FIG. 8 is a sectional elevation of the inner sleeve or tube being inserted into the outer sleeve or tube to form an insert such as is shown in FIG. 1;

FIG. 9 is a plan view of a blank of metallic material prior to roll forming into an inner or outer tube of the present invention;

FIG. 10 is a block diagram of the steps of the preferred method for manufacturing the insert of the present invention;

FIG. 11 is a fragmentary, sectional view of the insertion of an insert of the type shown in FIGS. 1-4 into the bored or reamed valve guide of an internal combustion engine; and FIG. 12 is a fragmentary, sectional elevation of the insertion of an insert of the type shown in FIGS. 5-7 into a bored or reamed valve guide of an internal combustion engine.

DESCRIPTION OF THE PREFERRED EMBODIMENTS

Referring now to the drawings in greater detail, FIGS. 1-4 illustrate a first embodiment 10 of the valve guide insert of the present invention. Insert 10 is a right circular cylindrical tube having multi-layered walls providing the tubes with both high wear resistance and lubricity as well as excellent heat transfer characteristics and strength. Insert 10 includes a right circular cylindrical outer or carrier sleeve or tube 12 preferably formed from steel (aluminum has also been utilized and other materials including cast iron may be utilized) and having a predetermined wall thickness, concentricity, and inside and outside diameters. Tube or sleeve 12 is preferably roll formed from a precut, planar sheet of steel or aluminum (FIG. 9) into the right circular cylinder such that it includes a longitudinally extending seam 14. Seam 14 may be straight or include an aligning step or offset as desired. The cylinder is welded at seam 14 and redrawn to eliminate the resulting flash. The welded tube is therefore a continuous, seamless outer tube within which is fitted the inner tube or sleeve 16. Alternately, as will be more fully explained below, tube or sleeve 12 may be formed from extruded, seamless tubing of a predetermined wall thickness.

Fitted within tube or sleeve 12 is an inner tube or sleeve 16 preferably roll formed from a precut blank or planar sheet (FIG. 9) of spring-tempered phosphor bronze metallic material such that it includes a longitudinally or axially extending seam 18 extending its entire length in one portion of its wall. In order to maintain axial alignment of the ends of the tube and also the side edges of the tube which oppose one another across seam 18, a step or offset is included in seam 18 including opposing edge portions 19, 20 each of which extend in a plane extending generally transverse to the longitudinal or axial direction of the tube.

Alternately, although not presently preferred, inner sleeve or tube 16 may be formed from extruded, seamless phosphor bronze tubing of an outside diameter slightly greater than the inside diameter of welded or seamless outer tube or sleeve 12 so that the inner tube or sleeve 16 may be press-fitted into tight, frictional engagement within the outer tube or sleeve 12.

In either case the thickness of the sheet material is chosen such that the O.D. of carrier tube 12 will be such as to fit within a valve guide formed to a standard diameter by a standard sized tool—i.e., $\frac{1}{2}''$, $\frac{5}{8}''$, 7/16'', etc.

As is seen in FIGS. 1-3, the sleeve or tube 16 is press fitted within outer sleeve or tube 12 such that it fits coaxially therein with the end surfaces of the two tubes or sleeves being coterminous with one another. A chamfer or bevel 22 is formed on the inside diameter at one end of the outer sleeve 12 to facilitate insertion by press-fitting of the inner sleeve or tube 16 within the outer sleeve or tube 12 in the manner shown in FIG. 8. Preferably, the outside diameter and edges at both ends of the inert 10 are chamfered or beveled at 24 to facilitate insertion of the insert in a valve guide after manufacture as is shown in FIGS. 11 and 12.

The preferred wall thicknesses for insert 10 are approximately 0.049 to 0.080 inches for sleeve 12, depending on the overall size of the insert, and approximately 0.016 inches for sleeve 16.

The O.D. of the finished insert 10 should exceed the diameter of the reamed passageway in which it is to be installed by approximately 0.0015–0.002 inches to insure a proper press-fit. The O.D. of the phosphor bronze liner 16 (when circumferentially compressed), similarly should exceed the I.D. of carrier tube 12 by approximately 0.002 inches to insure its positive retention in the carrier tube. Thus, where the guide is to be reamed with a one-half inch reamer or other tool (typical), the O.D. of the composite liner should be 0.5015–0.502 inches.

Insertion of inner tube or sleeve 16 within outer tube or sleeve 12 causes contraction or compression of the inner sleeve or tube closing seam 18 tightly such that the side edges of the roll formed blank press tightly against and abut one another. The inner tube or sleeve is thus substantially and effectively seamless after insertion as shown in FIGS. 3 and 4. A spiral groove 26 knurling or the like may be formed on the inside surface of the inner tube 16 after insertion within the outer tube by machining such as knurling or the like. The machining forces the inner tube outwardly against the outer tube to facilitate frictional retention of the inner tube within the outer tube. Alternately, machining of the groove or knurling may be performed prior to roll forming of the planar blanks of material into the right cylindrical cylinders.

Finally, the I.D. of the composite liner 10 may be finished after installation to match closely the diameter of the valve steam it is to carry. This is particularly advantageous since valve stem diameters for a nominal size often vary as much as 0.005 inches depending upon the particular manufacturer and extent of use.

Referring now to FIGS. 5-7, a second embodiment 30 of the insert for lining and relining valve guides is illustrated including an outer sleeve 32 roll formed from a blank or planar sheet of aluminum or steel into a right circular cylinder. Sleeve 32 includes a longitudinally extending seam 34 formed by the side edges of the precut blank or sheet being axially and radially aligned with one another but slightly spaced apart circumferentially. In order to prevent axial misalignment of the side edges across seam 34, a step or offset formed by transversely extending edges 36, 38 is provided at at least one position along the seam 34. Instead of closing and welding outer tube 32 as is done with tube 12 in insert embodiment 10, the outer sleeve is left with an open seam to be closed later upon press-fitting within the valve guide of an internal combustion engine.

The inner right circular cylinder 40 is also preferably roll formed but from a blank or precut sheet of phosphor bronze of a predetermined thickness. Sleeve 40 includes a longitudinally extending seam 42 formed by the circumferentially spaced, aligned side edges of the roll formed blank. Seam 42 also includes transversely extending, opposing edge portions 44, 46 in at least one portion along its length to prevent axial misalignment of the side edges which form the walls of the tube or sleeve.

As is best seen in FIGS. 5 and 6, inner tube or sleeve 40 is inserted within outer tube or sleeve 32 with seam 34, 42 respectively being left open. Seams 34, 42 need not be in any special relationship to one another because both will be tightly closed when insert 30 is positioned in a valve guide as in FIG. 12. Thus the seams may be in registry, spaced 180° apart or at any position in between without affecting the ultimate operation of the insert. Frictional engagement between the tubes or sleeves holds them together until they are inserted in an internal combustion engine valve guide in the manner shown in FIG. 12 utilizing a special insertion tool having a tapered opening which substantially matches the bored or reamed size of the valve guide. Insertion in the valve guide compresses or closes both of the seams 34, 42 in the outer and inner sleeves so that the sleeves become essentially seamless after insertion to prevent loss of oil or abnormal wear. In this case, the spiral groove, knurling, or broaching operation to provide an oil-retaining groove or the like within the inner sleeve is performed after insertion in the valve guide. Alternately, the blank or sheet phosphor bronze material may be grooved or knurled prior to roll forming into the right circular cylinder.

As an example of the diameters of the sleeves or tubes 32, 40 of insert 30, for a one-half inch valve guide bore, outer sleeve or tube 32 has a maximum uncompressed or free diameter of 0.562 inches. In its free state, the inner sleeve or tube, before insertion in the outer sleeve is 0.432 inches. When the seams 34 and 42 are closed, the outer sleeve or tube has a diameter of 0.502 inches designed to be press-fitted into an 0.500 inch bore or valve guide. The inside diameter of the outer sleeve or tube 32 in its free state is 0.401 inches. These dimensions include tolerances for spring back after forming and before pressing into the cylinder head of the internal combustion engine. The preferred wall thicknesses for insert 30 are the same as those discussed in connection with insert 10.

Like insert 10, the end outer diameter edges of outer sleeve 32 may be chamfered or beveled at 37 to facilitate insertion in the valve guide. At least one inner end edge of sleeve 32 may also be chamfered or beveled to facilitate insertion of inner sleeve or tube 40.

Referring now to FIGS. 8-10, the preferred embodiments 10 and 30 of the valve guide insert both include inner and outer sleeves or tubes preferably formed from flat metallic sheet stock of appropriate desired thickness, precut or fabricated into a blank as shown in FIG. 9. The side edges of the blank, insofar as liners 16 and 40 are concerned, are preferably precut to include the transverse edge portions which prevent axial misalignment in the finished cylindrical tubes. The thickness of the blank is chosen for the desired wall thickness of the finished tube or sleeve. The widths of the blanks for sleeves 12 and 32 or 16 and 40, denoted as dimension "A" in FIG. 9, are selected to effect a tight, press-fitted engagement with the reamed or bored valve guide being repaired or the inside surface of the outer sleeves, respectively, after rolling and when the seams of the resulting right circular cylinders are closed.

Each blank is formed by conventional progressive rolling to its desired diameter depending on whether it will be used for an inner or outer sleeve or tube. Such rolling allows the concentricity of the tubes being formed to be precisely and accurately controlled while the wall thickness of the resulting tube or sleeve is maintained because of the uniform thickness of the precut blank.

In the case of sleeve or tube 12 shown in FIGS. 1-4, which is preferably roll formed from sheet steel, the side edges of the rolled blank are axially and radially aligned, abutted together, and welded by electrical resistance welding along the resulting butt joint to form a closed, seamless tube. Thereafter, the closed, seamless, welded tube is redrawn to remove any welding flash and to obtain the true desired diameter for the outer tube. The inside wall surfaces of the outer tube are finish machined to the proper size designed to receive the inner sleeve or tube, after which the outer tube is cut to length and chamfered or beveled on its outer diameter end edges and at least one of its inner diameter end edges. The outside diameter of the outer tube is then centerless ground to the exact desired size for insertion into the reamed or bored valve guide being repaired.

In the case of outer sleeve or tube 32, the blank of material shown in FIG. 9 preferably either steel or aluminum is roll formed to the desired diameter but the seam between the opposing, aligned side edges is left open. The inner sleeve or tubes 16 or 40, formed from sheet phosphor bronze material of desired wall thickness for the inner tubes, are roll formed in the same manner as outer sleeve 32 with their seams 18, 42 being left open.

After formation of the inner and outer sleeves or tubes, the two are assembled together in slightly differing manners depending on embodiment 10 or 30. Insert 10 is assembled as shown in FIG. 8 wherein the outer closed seamless or welded tube 12 is positioned in an upstanding manner in a fixture 50 on a supporting surface. A cylindrical, hollow insertion tool 52 is positioned on the top end edge of sleeve 12 such that its lowermost inside diameter is coaxial with and aligned with the inside diameter of sleeve 12. The inside diameter of tool 52 is equal to or slightly less than that of sleeve or tube 12. The upper end of the tool 52 tapers at 54 to the desired inside diameter of the inner sleeve 12 such that the inner sleeve or tube 16 or 40 can be easily inserted in its expanded, free state in the upper end and driven downwardly to compress and contract the size of the inner tube and inserted or press-fitted within the outer sleeve or tube 12. Such insertion or press-fitting is accomplished by driving sleeve 16 through tool 52 with a shouldered cylindrical tool 56 located in the upper free end of inner sleeve 16. Tool 52 has a length at least as long as the length of sleeve 16 for fully supporting the relatively thin side walls of sleeve 16 during such insertion. Sleeve 16 is driven completely through tool 52 into place within sleeve 12 such that it is coterminous and aligned therewith.

In the case of the assembly of insert 30, tool 52 as explained above may also be used; however, because outer sleeve or tube 32 is expandable because of the open seam 34, inner tube or sleeve 40 may be more easily pressed or fitted within outer sleeve 32 since tight, gripping frictional engagement of the two tubes does not result until the insert 30 is in place within the cylinder head.

Following press-fitting of the tubes 12 and 16 together for insert 10, the inside wall surface of the inner tube 16 is spiral rolled or knurled to provide an oil-retaining groove to facilitate lubrication of the valve stem when inserted therethrough in the cylinder head. Such spiral rolling or knurling which may also be accomplished by ball broaching or other machining operation, also forces or expands the inner tube outwardly against the outer sleeve or tube to facilitate frictional engagement and retention of the tubes within one another to prevent separation of the tubes when in use. Although this latter step may also be performed after tubes 32 and 40 are assembled together, it more preferably is accomplished after insertion of insert 30 in the cylinder head. Alternatively, the blanks as shown in FIG. 9 from which the inner and outer sleeves or tubes are roll formed, may be knurled or grooved prior to rolling.

After assembly in the above manner, inserts 10 or 30 are inserted in the bored or reamed valve guides being repaired as shown in FIGS. 11 and 12. In the case of insert 10, one of the chamfered ends of insert 10 is placed against a valve guide 60 to be repaired which has been previously reamed or bored to a standard diameter. Thereafter, a driving tool 58 having a shoulder at one end and a cylindrical locating projection coaxial therewith is placed over the end of insert 10 (FIG. 11) and the insert is driven into place within the bored or reamed valve guide. Because insert 10 is completely closed and compressed to its ultimate outside diameter, it is not necessary to use any tapering insert tool 52 or to support the side walls of insert 10 during such insertion.

However, in the case of insert 30 as shown in FIG. 12, both the outside tube 32 and the inner tube or sleeve 40 are in an expanded condition larger than their ultimate sizes when inserted in the valve guide 60'. In such case, when using insert 30, an insert tool 62 having one end matching or slightly smaller than the desired inside diameter of the valve guide 60' is placed atop the valve guide while the other end includes a taper 64 allowing easy insertion of the expanded insert 30 but narrowing to the desired diameter at the lower end. A tool 58 having a standard diameter equivalent to the inside diameter of guide 60' and the lower end of tool 62 is used to drive insert 30 through insert tool 62 into the valve guide. Tool 62 thus compresses or contracts both the inner and outer sleeves during such insertion to their final, ultimate diameters wherein seams 34, 42 are closed tightly to form a substantially seamless insert as in the case of insert 10 which is completed prior to assembly in the valve guide. Tool 62 preferably has a length at least as long as insert 30 so as to provide support for the side walls of the insert during such insertion in the valve guide 60'. After insertion of the inserts 10 and 30 as shown in FIGS. 11 and 12, slight finishing, boring, or reaming of the inside diameter to assure matching to the diameter of the valve stem fitted therethrough may be necessary. This is particularly true when the insert has been shipped in "unsized" condition so that minor variations in valve stem diameter may be accommodated in the field. The inserts may either be finished in specified lengths which have been preselected to match the engine being overhauled or manufactured, or may be cut off after installation by standard techniques.

After such insertion of either insert 10 or 30, the valve stem of the poppet valve may be inserted through the inside diameter of the insert and the remainder of the valve train assembled on the cylinder head. As with insert 10, insert 30 in its compressed state has an outside diameter slightly greater than the inside diameter of valve guide 60' so as to be tightly press-fitted therewith and to stay in place during use.

The present invention, therefore, provides a valve guide insert for lining or relining during repair of worn valve guides including multi-layered walls, the interior of which is highly wear resistant and self-lubricating or lubricious because of the use of phosphor bronze, and the exterior of which is size accommodated to standard diameter tools. Other materials having these qualities may also be used. The outer tube or sleeve provides strength and support for the inner sleeve or tube. Not only does the separate formation and subsequent assembly of the two different types of inner and outer sleeves or tubes result in the above advantages but also importantly allows accurate and precise control of dimensional tolerances for the insert including wall thickness, concentrically inside and outside diameters and the like. Finally, because such outside diameters can be so precisely controlled, standard sized reaming and boring tools used to prepare the valve guides for insertion of the insert may be used.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

I claim:

1. A method for forming a multi-layered, high strength metallic, internal combustion engine valve guide insert having high heat transfer qualities, lubricity, and high wear resistance and adapted for later insertion in and lining/relining of a valve guide of an internal combustion engine comprising the steps of:

(1) providing a first cylindrical metallic sleeve having a controlled wall thickness, a controlled concentricity, and controlled inside and outside dimensions, and inside and outside wall surfaces, said first cylindrical sleeve having an outwide diameter adapted to fit tightly within a valve guide when the valve guide is machined with a standard sized boring or reaming tool;

(2) providing a second cylindrical metallic sleeve formed from sheet material and also having a controlled, relatively thin, wall thickness thinner than said first sleeve, a controlled concentricity, and controlled inside and outside dimensions, and inside and outside wall surfaces; and (3) inserting said second sleeve within said first sleeve by confining said thin walled, second sleeve to a dimension at least equal to the inside dimension of said first sleeve by forcing said second sleeve through while surrounding said second sleeve with an insertion tool and supporting said second sleeve over its entire length with said insertion tool such that the outside wall surface of said second sleeve is maintained at said inner dimension of said first sleeve as said second sleeve is inserted whereby said second sleeve tightly frictionally engages the inside wall surface of said first sleeve after insertion to prevent separation thereof when in use.

2. The method of claim 1 including roll forming said first sleeve from a sheet of metallic material such as steel or aluminum, said sheet being first cut to desired size in its planar form.

3. The method of claim 1 including roll forming said second sleeve from a sheet of metallic material such as phosphor bronze, said sheet being first cut to desired size in its planar form.

4. The method of claim 1 wherein said first sleeve is formed by extruding a metallic material into a seamless sleeve having a desired wall thickness.

5. The method of claim 1 wherein said first sleeve is formed by cutting a blank of desired size from a sheet of metal and rolling said blank into cylindrical sleeve with controlled concentricity with a seam extending axially along one wall thereof.

6. The method of claim 5 including welding said seam in said rolled, tubular blank along its entire length to form a closed, seamless sleeve.

7. The method of claim 6 including drawing said welded sleeve to remove any welding flash and to obtain true, accurate, substantially constant inside and outside diameters with precisely controlled concentricity.

8. The method of claim 7 including machining the inside wall surface of said welded first sleeve to a desired inside diameter, cutting said first sleeve to a desired overall length, chamfering at least one outside diameter end edge of said first sleeve, and chamfering one inside diameter end edge of said first sleeve.

9. The method of claim 8 including machining the outside surface of said first sleeve to a desired outside diameter.

10. The method of claim 9 including press-fitting said second sleeve into said first sleeve with a hollow, cylindrical tool having at least one portion of its interior bore matching the inside diameter of said first sleeve and a length at least as long as said second sleeve so as to support the walls of said second sleeve during such insertion.

11. The method of claim 10 including forming a generally spiral groove on the inside surface of said second sleeve after said second sleeve is press-fitted within said first sleeve, said forming of said spiral groove forcing said second sleeve outwardly against the inside of said first sleeve to help retain the sleeves together.

12. The method of claim 1 wherein said second sleeve is formed by cutting a blank of desired size from a sheet of metal and rolling said blank into a cylindrical sleeve with controlled concentricity with a seam extending axially along one wall thereof.

13. The method of claim 12 including forming a groove on one surface of said blank prior to its being rolled into tubular form, said groove extending generally transverse to the longitudinal axis of said sleeve after rolling.

14. The method of claim 1 including cutting said second sleeve to match the length of said first sleeve prior to inserting said second sleeve within the first such that the sleeves are coterminous at both ends of the insert.

15. The method of claim 1 wherein said insertion step includes forcing said second sleeve outwardly against said first sleeve after said second sleeve is within said first sleeve to help retain said sleeves together.

16. A method for forming a multi-layered, high strength, metallic, internal combustion engine valve guide insert having high heat transfer qualities, lubricity, and high wear resistance and adapted for later insertion in and lining/relining of a valve guide of an internal combustion engine comprising the steps of:

(1) providing a first cylindrical metallic sleeve having a controlled wall thickness, a controlled concentricity, and controlled inside and outside dimensions, and inside and outside wall surfaces, said first cylindrical sleeve having an outside diameter adapted to fit tightly within a valve guide when the valve guide is machined with a standard sized boring or reaming tool;

(2) providing a second, extruded, cylindrical, metallic sleeve also having a controlled, relatively thin, wall thickness thinner than said first sleeve, a controlled concentricity, and controlled inside and outside dimensions, and inside and outside wall surfaces; and (3) inserting said second sleeve within said first sleeve by confining said thin walled, second sleeve to a dimension at least equal to the inside dimension of said first sleeve by forcing said second sleeve through while surrounding said second sleeve with an insertion tool and supporting said second sleeve over its entire length with said insertion tool such that the outside wall surface of said second sleeve is maintained at said inner dimension of said first sleeve as said second sleeve is inserted whereby said second sleeve tightly frictionally engages the inside wall surface of said first sleeve after insertion to prevent separation thereof when in use.

17. The method of claim 16 wherein said second sleeve is formed by extruding a metallic material into a seamless sleeve having a desired wall thickness.

18. A method for forming a multi-layered, high strength, metallic, internal combustion engine valve guide insert having high heat transfer qualities, lubricity, and high wear resistance and adapted for later insertion in and lining/relining of a valve guide of an internal combustion engine comprising the steps of:

(1) providing a first cylindrical metallic sleeve having a controlled wall thickness, a controlled concentricity, and controlled inside and outside dimensions, and inside and outside wall surfaces, said first cylindrical sleeve having an outside diameter adapted to fit tightly within a valve guide when the valve guide is machined with a standard sized boring or reaming tool;

(2) providing a second cylindrical metallic sleeve formed from sheet material and also having a controlled, relatively thin, wall thickness less than one-half that of said first sleeve, a controlled concentricity, and controlled inside and outside dimensions, and inside and outside wall surfaces; and (3) inserting said second sleeve within said first sleeve by confining said thin walled, second sleeve to a dimension at least equal to the inside dimension of said first sleeve by forcing said second sleeve through while surrounding said second sleeve with an insertion tool and supporting said second sleeve over its entire length with said insertion tool such that the outside wall surface of said second sleeve is maintained at said inner dimension of said first sleeve as said second sleeve is inserted whereby said second sleeve tightly frictionally engages the inside wall surface of said first sleeve after insertion to prevent separation thereof when in use.

* * * * *

UNITED STATES PATENT AND TRADEMARK OFFICE
CERTIFICATE OF CORRECTION

PATENT NO. : 4,185,368
DATED : January 29, 1980
INVENTOR(S) : James A. Kammeraad It is certified that error appears in the above-identified patent and that said Letters Patent are hereby corrected as shown below:

Column 6, line 7:
"fabricated" should be --fashioned--

Column 8, line 38:
"concentrically" should be --concentricity--

Column 8, Claim 1, line 61:
"outwide" should be --outside--

Signed and Sealed this

Eighth Day of July 1980

[SEAL]

Attest:

SIDNEY A. DIAMOND

Attesting Officer　　Commissioner of Patents and Trademarks